US011520674B2

(12) United States Patent
Jmt et al.

(10) Patent No.: US 11,520,674 B2
(45) Date of Patent: Dec. 6, 2022

(54) MANAGING CONTAINERS ON A DATA STORAGE SYSTEM

(71) Applicant: EMC IP Holding Company LLC, Hopkinton, MA (US)

(72) Inventors: Adarsh Pradhan Jmt, Bangalore (IN); Maneesh Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 474 days.

(21) Appl. No.: 16/569,692

(22) Filed: Sep. 13, 2019

(65) Prior Publication Data
US 2021/0081292 A1   Mar. 18, 2021

(51) Int. Cl.
*G06F 11/30* (2006.01)
*G06F 3/06* (2006.01)
*G06F 9/50* (2006.01)

(52) U.S. Cl.
CPC .......... *G06F 11/3051* (2013.01); *G06F 3/067* (2013.01); *G06F 3/0617* (2013.01); *G06F 3/0631* (2013.01); *G06F 9/5027* (2013.01); *G06F 11/3006* (2013.01)

(58) Field of Classification Search
CPC .. G06F 11/3051; G06F 3/0617; G06F 3/0631; G06F 3/067; G06F 9/5027; G06F 11/3006
See application file for complete search history.

(56) References Cited

U.S. PATENT DOCUMENTS

| | | | | |
|---|---|---|---|---|
| 9,417,896 | B2* | 8/2016 | Hintermeister | G06F 9/50 |
| 10,091,072 | B2* | 10/2018 | Cropper | G06F 9/45558 |
| 10,298,515 | B1* | 5/2019 | Kirchhofer | H04L 45/64 |
| 10,324,754 | B2* | 6/2019 | Cao | G06F 9/45533 |
| 10,339,455 | B1 | 7/2019 | Parush-Tzur et al. | |
| 11,132,450 | B2* | 9/2021 | Goyal | G06F 21/62 |
| 2004/0244001 | A1* | 12/2004 | Haller | G06F 9/505 718/100 |
| 2011/0295999 | A1* | 12/2011 | Ferris | G06F 11/3006 709/224 |
| 2016/0371127 | A1* | 12/2016 | Antony | G06F 9/505 |

(Continued)

*Primary Examiner* — Benjamin C Wu
(74) *Attorney, Agent, or Firm* — Muirhead and Saturnelli, LLC

(57) ABSTRACT

Mechanisms and techniques are employed for managing the allocation and load balancing of storage system resources for the containerized, distributed execution of applications on a storage system. A control component executing on a processing component of the storage system may control reserving the necessary resources on one or more processing components to implement an application, and control a container management module to create, deploy and/or modify one or more containers on one or more processing components of the storage system. The one or more containers then may be executed to implement the application. Multiple processing components of the storage system may have a resource management module executing thereon. The control component may exchange communications with the one or more resource management modules of each processing component to determine the resources available within the processing component; e.g., to determine whether the processing component can satisfy the resource requirements of the application.

23 Claims, 4 Drawing Sheets

(56) References Cited

U.S. PATENT DOCUMENTS

2020/0186445 A1\* 6/2020 Govindaraju ........... H04L 67/34
2021/0117244 A1\* 4/2021 Herdrich ................ G06F 9/5027
2022/0100565 A1\* 3/2022 Tatara ....................... G06F 7/57

\* cited by examiner

MANAGING CONTAINERS ON A DATA STORAGE SYSTEM

BACKGROUND

Technical Field

This application generally relates to data storage systems, and more particularly to containers on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments of the invention, a method is performed for a data storage system having a plurality of processing components that collectively provide resources for executing applications on the data storage system, each processing component being a physically discrete processing component. The method includes: receiving resource requirements for a first application to execute on the data storage system, reserving a quantity of one or more resources on at least a first of the plurality of processing components, creating one or more containers on the at least first processing component, each container having at least a portion of the quantity of reserved resources allocated thereto for executing the first application, and executing the first application by executing the one or more containers on the at least first processing component.

The method may include determining whether the quantity of resources are available on the plurality of processing components collectively, where the steps of reserving, creating and executing are performed if it is determined that the quantity of resources are available on the plurality of processing components collectively.

The method may include, if it is determined that the quantity of resources is not available on the plurality of processing components collectively, notifying one or more entities that the quantity of resources is not available.

The step of determining whether the quantity of resources are available on the plurality of processing components collectively may include, on each of the plurality of processing components, one or more resource management components determining available resources on the processing component.

At least one of the plurality of processing components may include a master module that controls performance of the method, and the method further include: receiving the resource requirements via a user interface module; the user interface module sending information indicative of the resource requirements to a control module of the master module; and the control module exchanging communications with the one or more resource components on each of the plurality of processing components to determine the available resources on each of the plurality of processing modules.

The master module may includes a container management module for deploying and managing containers, and the method may further include the control module providing instructions to the container management module to create the one or more containers on the at least first processing component.

The method may further include monitoring activity on at least the first of the processing elements, and modifying the one or more containers and/or adding more containers based on the monitored activity.

In some embodiments, a data storage system includes one or more processors and a memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
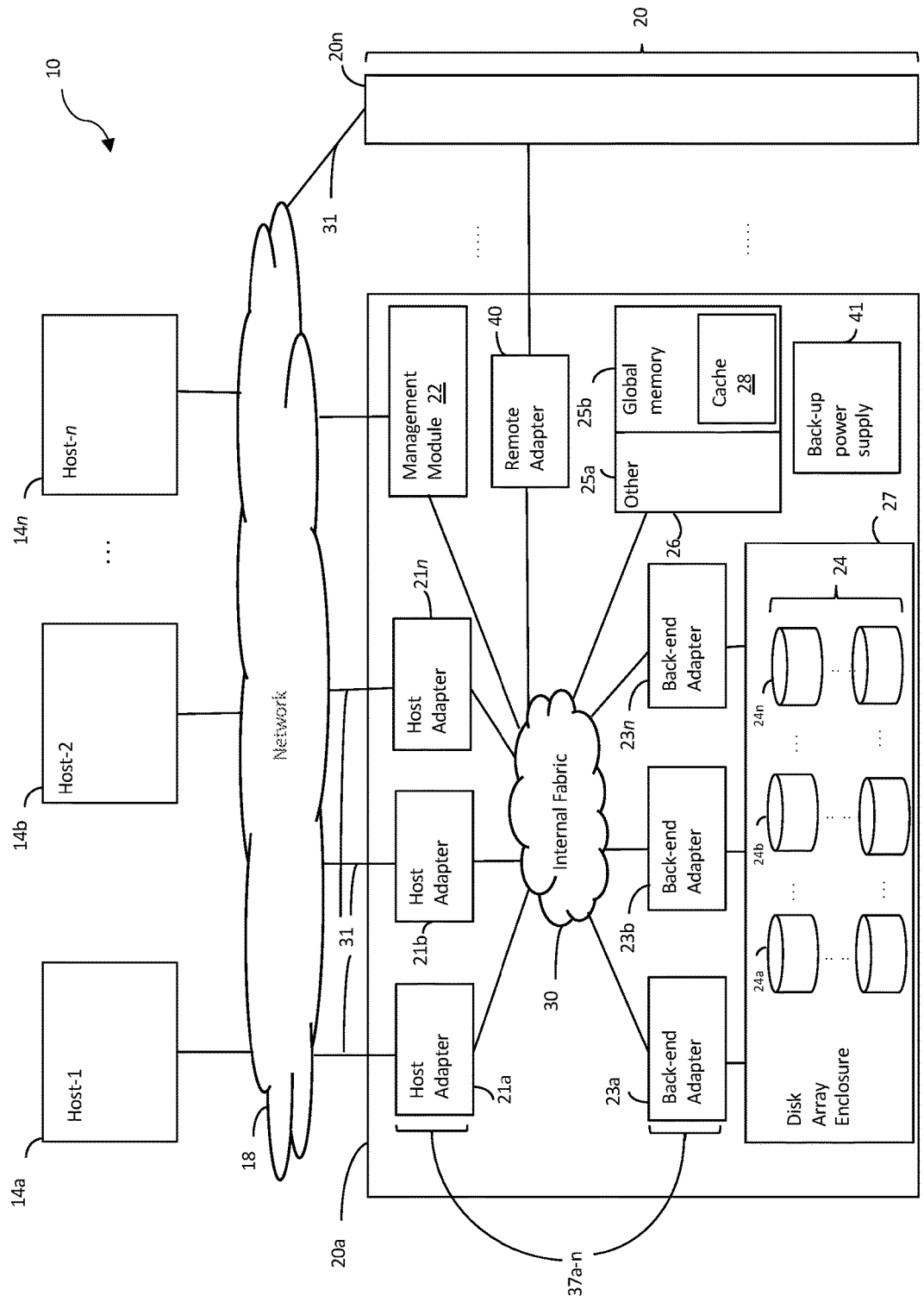
FIG. 1 is a block diagram illustrating an example of a data storage network, according to embodiments of the invention.

A storage system may have a distributed processing architecture including multiple physically discrete processing components, for example, where each processing component has its own computing, networking and/or memory components. For example, a PowerMax™ system made available from Dell EMC has a plurality of director boards. The processing of I/O for multiple applications executing on a plurality of host systems may be distributed across multiple such processing components. In fact, the execution of the plurality of sub-operations involved in executing a single I/O request (e.g., a single SCSI command) may be distributed across multiple processing components of a storage system (e.g., across multiple director boards). Such distributed processing may provide better performance than non-distributed processing of I/O for host applications.

In addition to a storage system providing data (e.g., I/O) services to applications running on host systems, a variety of applications may be executed on the storage system itself, for example, as part of managing or providing technical support for the storage system. Better overall system performance may be achieved by distributing the processing of such applications across multiple processing components.

Containerized environments are becoming popular to manage customer applications in today's world. With containerized applications, it's relatively easy to quickly ramp-up application instances based on customers' business demands. However, it may prove difficult to manage application instances in real time with respect to use of resources, including, for example, computing, memory, and networking resources, and to load balance and schedule resource consumption by application instances. It may prove even more difficult to manage resources, load balance and schedule across multiple processing components of a storage system having distributed storage.

What may be desirable is an improved ability to manage the allocation and load balancing of storage system resources for the containerized, distributed (e.g., across multiple processing components) execution of applications on a storage system.

Described herein are mechanisms and techniques for managing the allocation and load balancing of storage system resources for the containerized, distributed execution of applications on a storage system. To implement an application, a primary control module executing on a processing component of the storage system may control reserving the necessary resources on one or more processing components, and may control a container management module to create, deploy and/or modify one or more containers on one or more processing components of the storage system.

A user interface module may be provided that enables a user to specify resource requirements for an application, and the user interface module may communicate this information to the primary control module. Each of the multiple processing components of the storage system may have a resource management module executing thereon. The primary control module may exchange communications with the one or more resource management modules of each processing module to determine the resources available within the processing component; e.g., to determine whether the processing component can satisfy the resource requirements of the application.

The primary control module may be configured to control the user interface to inform a user that the system is currently determining whether the quantity of required resources are available. The primary control module may determine whether another request for application resources is currently being serviced, and, if not, begin exchanging communications with the one or more resource management modules to determine whether enough resources are available.

If there are not enough resources available on the storage system, the primary control module may control the user interface to inform the user. If there are enough resources, the primary control module may exchange communications with the resource management module(s) of one or more processing components to reserve the necessary resources, and control the container management module to create, deploy and/or modify one or more containers on the one or more processing components of the storage system in accordance with the reserved resources.

In some embodiments, it may be desirable to monitor the utilization of system resources (e.g., compute, network, memory) by an application, and/or the performance of the application. For example, the user interface may enable the user to specify to monitor utilization and/or performance, and/or to specify that load balancing of applications across the multiple processing components is to be implemented, for which monitoring of utilization and/or performance of applications may be required. The desire to load balance, monitor performance and/or monitor utilization may be communicated to the primary control module, in response to which the primary control module may instruct a scheduling and collection module to schedule the collection of utilization and/or performance information from the one or more processing components having containers executing the application. The scheduling and collection module may be configured to poll (e.g., per a schedule) the resource management modules to provide the utilization and/or performance information for the containers executing on the processing component for the application.

The scheduling and collection module may make entries in a container management database, which may be read by a monitor and execution module, which may be configured to analyze utilization and performance information, for example, in connection with load balancing. In response to this analysis, or in response to a scheduled auto-update for an application, additional resources may be reserved and one or more containers may be added, modified or removed, for example, under control of the primary control component.

For illustrative purposes, various embodiments of the invention are described herein in relation to management applications or the like implemented using containers executing within an operating system on a data storage system. However, it should be appreciated that the invention is not so limited, as in some embodiments only a portion of such an application may be executing on the data storage system and another portion of the application may be executing on one or more separate devices and/or within one or more separate operating systems executing on the data storage system. Further, in some embodiments, in addition to, or as an alternative to, implementing management applications, the containers may be implementing data services (e.g., read and write operations) for applications running on one or more host systems. Any of the techniques described herein as being applied to applications, or specifically to management applications, also may be applied to data services or other services implemented on a storage system.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
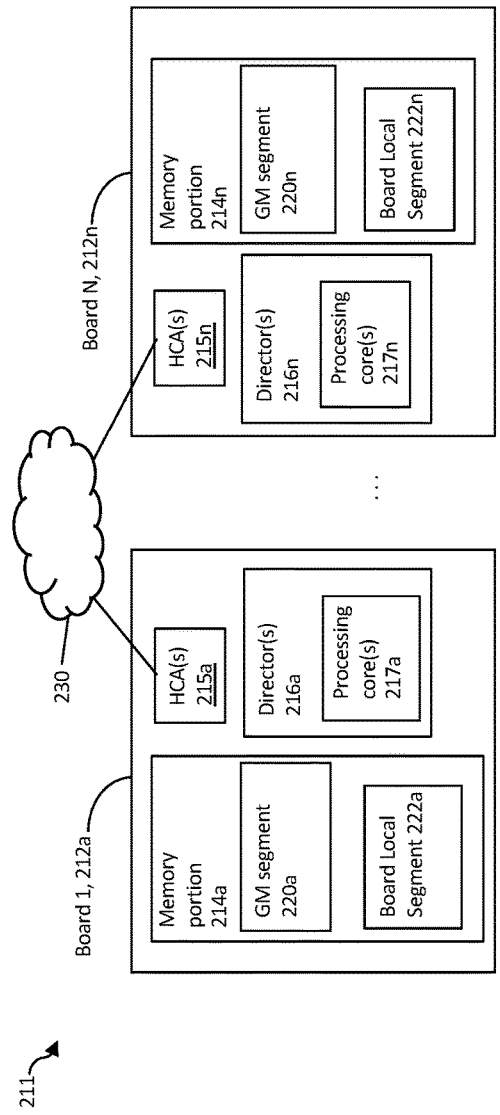
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
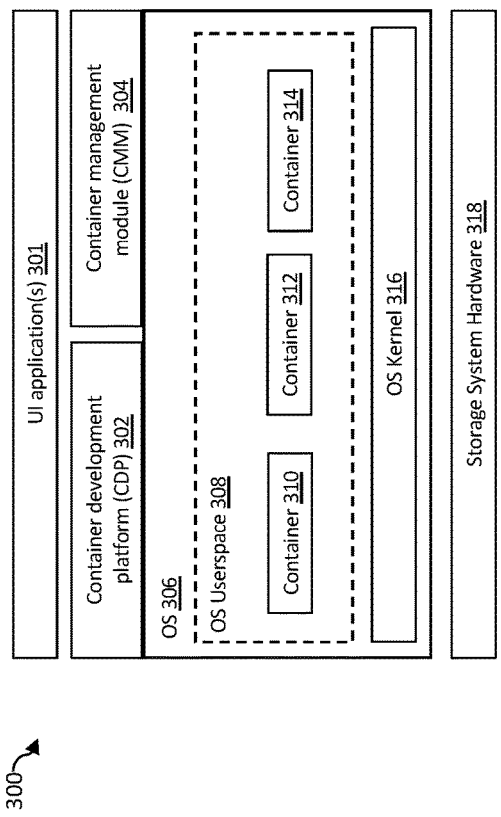
FIG. 3 is a block diagram illustrating an example of logical layers of a data storage system using containers, according to embodiments of the invention.

FIG. 3 is a block diagram illustrating an example of logical layers of a data storage system 300 (e.g., storage system 20a and/or 211) using containers, according to embodiments of the invention. Other embodiments of logical layers of a data storage system using containers, for example, variations of the logical layers illustrated in FIG. 3, are possible and are intended to fall within the scope of the invention.

Data storage system 300 may include any of: container development platform (CDP) 302, container management module (CMM) 304, operating system (OS) 306, storage system hardware 318, or any suitable combination of the foregoing. OS 306 may be any of a variety of operating systems capable of being containerized such as, for example, a Linux-based operation system, e.g., SUSE Enterprise Linux Server (SLES) version 12, SP3 or above. The OS 306 may include an OS kernel 316, and may include an OS userspace 308 within which one or more containers 310, 312, 314 may be executed. It should be appreciated that, while only three containers are illustrated in FIG. 3, any number of containers may be implemented within the technical capabilities of the operating system 306 and storage system hardware 318. Each container may implement an application or a portion thereof including, for example, any of: a storage management and/or configuration application, a virtualization application, a cloud application, a file applications, another type of applications or any suitable combination of the foregoing, including any of Unisphere™ for PowerMax (U4P) made available from Dell EMC, Solutions Enabler (SE) made available from Dell EMC, VMware vSphere® Storage APIs for Storage Awareness (VASA) made available from VMware, Inc. of Palo Alto, Calif. (VMware), VMware vSphere® Storage APIs-Array Integration (VAAI), or VMware vSphere® vApp(s)™ implemented using VMware technology.

CDP 302 may be configured to use operating-system-level virtualization to create and deliver containers (e.g., containers 310, 312 and 314) to be run on OS kernel 316. CDP 302 may be implemented using any of a variety of container development products, such as, for example, a Docker container development platform (e.g., including a Docker runtime environment) made available by Docker, Inc.

CMM 304 may be configured to deploy and manage containers, for example, across multiple physically discrete processing components of the storage system hardware 318. CMM 304 may be implemented using any of a variety of container management technologies and products, such as, for example, a Kubernetes container orchestration system (hereinafter "K-system") made available from the Cloud Native Computing Foundation.

Figure 4:
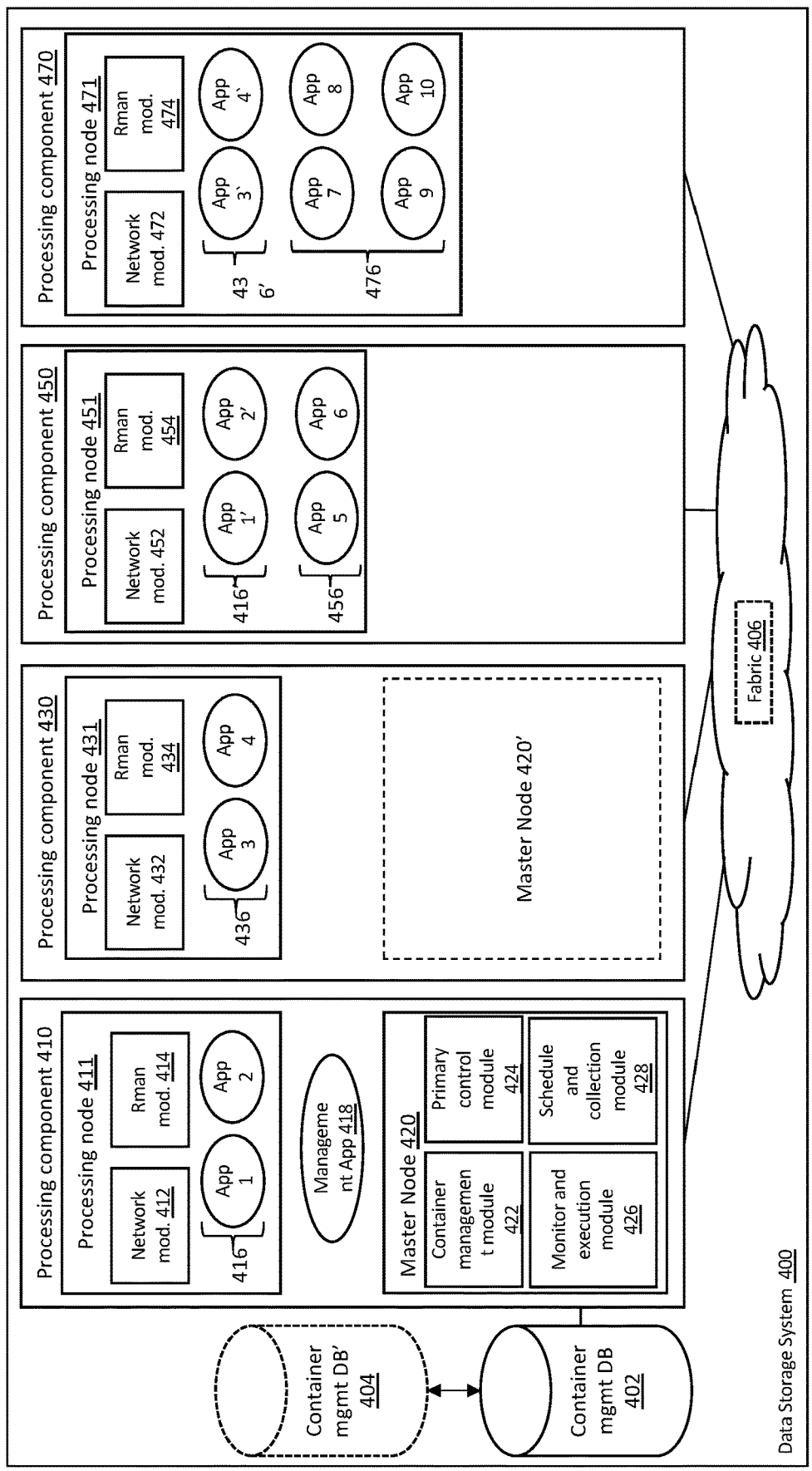
FIG. 4 is a block diagram illustrating an example of a data storage system using containers, according to embodiments of the invention.
Figure 5:
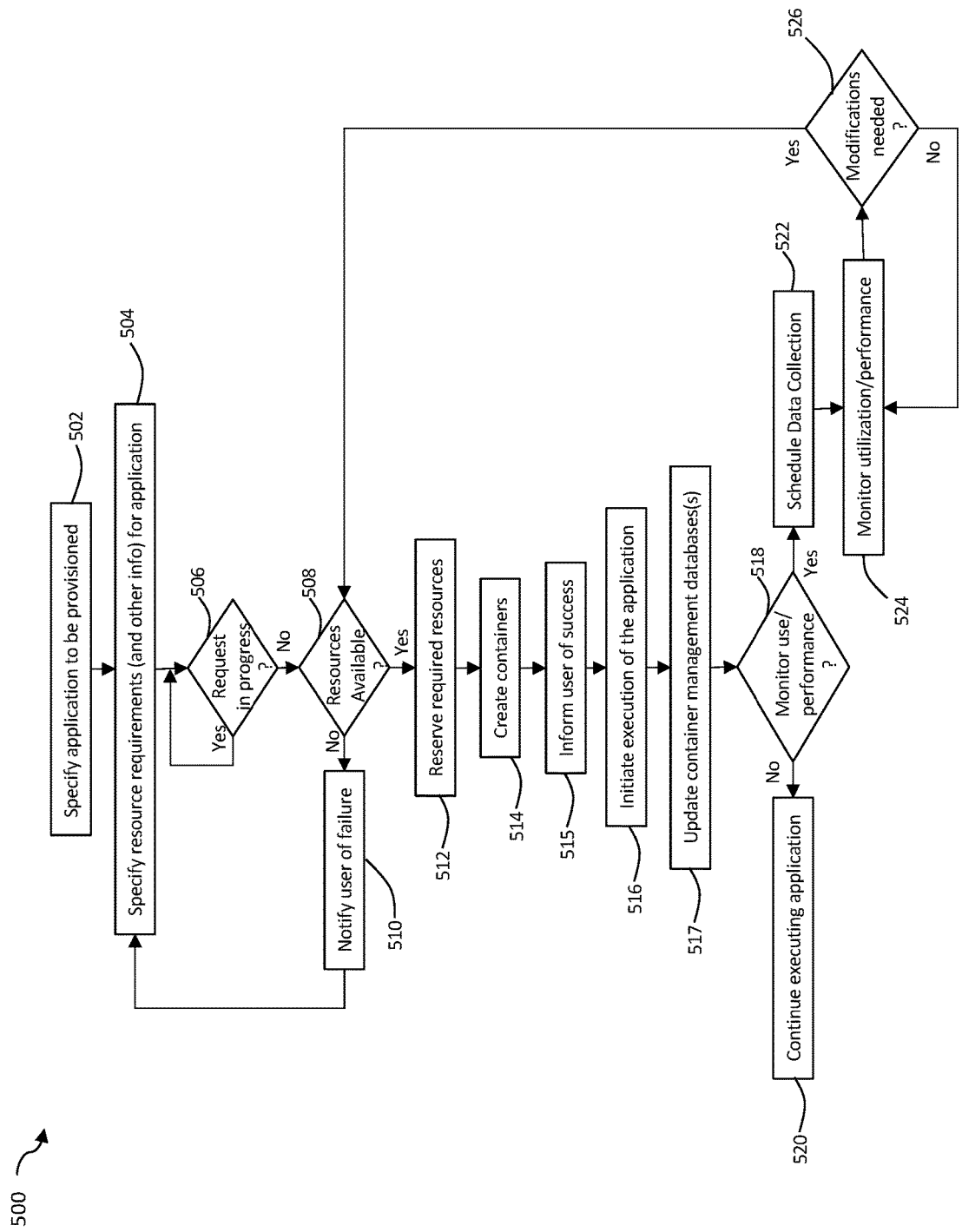
FIG. 5 is a flow chart illustrating an example of a method of using containers to implement applications on a storage system, according to embodiments of the invention.

The logical layers of the data system 300 may be used to implement one or more aspects of the invention, for example, as described in relation to FIGS. 4 and 5.

FIG. 4 is a block diagram illustrating an example of a data storage system 400 using containers, according to embodiments of the invention. Other embodiments of a data storage system using containers, for example, variations of data storage system 400, are possible and are intended to fall within the scope of the invention. Data storage system 400 may be implemented using one or more components described in relation to data storage systems 20a, 211 and/or 300.

Data storage system 400 may include one or more processing components 410, 430, 450 and 470, fabric 406 (e.g., 30 and/or 230) and one or more container management databases (CMDBs) 402 and 404. CMDB 402 may serve as a primary database for managing containers and CMDB 404 may serve as a redundant and/or backup container management database. For example, CMDB 404 may be a mirror database of CMDB 402. Each of CMDBs 402 and 404 may be stored in one of physical storage devices 24a-n, and may be associated with and referenced as an LSU. The LSU associated with CMDB 402 may be mirrored, cloned, snapped or the like to the LSU associated with CMDB 404. Each of CMDBs 402 and 404 may be implemented using any of a variety of database technologies, such as, for example, ETCD key-value store technology, which may be configured for use with a K-system. In some embodiments, each of CMDBs 402 and 404 may be configured to segregate information specific to CMM 422 (e.g., K-system-specific information) from other container management-related information described herein.

Each of the one or more processing components 410, 430, 450 and 470 may be a logical component or a discrete physical component of a data storage system, for example, one of director boards 212a-n (e.g., of a PowerMax system). It should be appreciated that, while only four processing components are illustrated in FIG. 4, any number of processing components may be implemented within the technical capabilities of the storage system 400.

Each processing component 410, 430, 450 and 470 may include a processing node 411, 431, 451 and 471, respectively. Each of the processing nodes 411, 431, 451 and 471 may be configured to host one or more applications 416, 436, 456 and 476, respectively, e.g., in a containerized format. In some embodiments, one or more applications may be implemented on multiple processing components. For example, a portion of applications 416 may be implemented as application 416' on processing node 451 and a portion of application 436 may be implemented as application 436' on processing node 471. Further, each of the processing nodes 411, 431, 451 and 471 may be configured to include a network module 412, 432, 452 and 472, respectively, and a resource management (rman) module 414, 434, 454 and 474, respectively. Each of the network modules and rman modules may be implemented as a group of one or more containers referred to herein as a "pod" (e.g., a Kubernetes pod).

In some embodiments, one of the processing components (e.g., processing component 410) includes a master node (e.g., master node 420), and in some embodiments one or more second processing modules may include a master node for redundancy. For example, master node 420 may be mirrored as mirror master node 420' on processing node 430. Mirror master node 420' may serve as a backup master node that remains inactive while master node 420 remains active. However, if it is detected that master node 420 is no longer active (e.g., by monitor and execution module (MEM) 426), mirrored master mode 420' may be activated to serve in the place of master node 420. Processing components 410 and 430 may be director boards of a single engine of a PowerMax storage system.

The master node 420 (and mirrored master node 420' if any) may include primary control module (PCM) 424, container management module (CMM) 422 (e.g., CMM 304), MEM 426, schedule and collection module (SCM) 428, other modules, or any suitable combination of the foregoing. CMM 422 may be implemented using any of a variety of container management technologies and products, such as, for example, a K-system, which may include a set of CLIs, APIs, containers and other software elements that enable other components (e.g., PCM 424) to interact with CMM 422 to manage containers. For example, CMM 422 may include a set of K-system software elements such as, for example, kube-scheduler, kube-api server, kubectl, kubeapi, etc. Actions performed or assisted by CMM 422 are described in more detail elsewhere herein.

PCM 424 may serve as a primary control component for the implementation of one or more applications as containers, including, for example, controlling: the determination of available resources on processing components 410, 430, 450, 470; reserving such resources; the deployment of new applications on the processing components; the scaling up or down of such applications, determining and selecting a most suitable of the processing component(s) on which to implement an application; and load balancing of applications among the processing components, including monitoring, collecting data and performance and/or utilization analysis.

PCM 424 may be configured to serve as a sort of wrapper around CMM 422, for example, by being configured to utilize APIs and/or CLIs made available by CMM 422 to implement container management functionality. PCM 424 may be configured to communicate with one or more management applications 418 with which users interface, for example, SE or U4P, and may be configured to translate user instructions received via such application to actions, e.g., by issuing instructions to one or more of CMM 422, MEM 426 and SCM 428 and one or more of processing nodes 411, 431, 451 and 471 based on the user instructions. Actions performed or assisted by PCM 424 are described in more detail elsewhere herein.

Management application 418 may be configured to enable a user to specify input for any of a variety of management functions, including, for example, load balancing functions, auto-upgrades, time-to-live (TTL), etc. Management application 418 is shown separately from applications 416 for illustrative purposes, but in some embodiments may be one of applications 416 executed as one or more containers (e.g., as pod).

SCM 428 may be configured to schedule activity based on user input received by management application 418. For example, PCM 424 may communicate instructions based on such user inputs to SCM 428. SCM 428 may be configured to store entries CMDB 402 based on the instructions received from PCM 424 (based on a user's management input). For example, SCM 428 may make one or more cron entries in CMDB 402 based on such instructions, which may be accessed, for example, by a cron utility implemented by MEM 426 (e.g., in accordance with Linux or another Unix-based OS) to execute scheduled actions.

SCM 424 may be configured to collect and store in CMDB 402 any of a variety of information about applications (e.g., applications 416, 436, 456 and 476) executing on processing components 410, 430, 450 and 470. SCM 428 may be configured to exchange communications with one or more rman modules 414, 434, 454 and 474, to control the one or more rman modules to monitor, collect and report to the SCM 428 performance and/or utilization information for applications (e.g., executing within containers) running on their respective processing components. Such control may be performed in response to a user specifying load balancing for an application through management application 418. SCM 428 may be configured to collect such performance and/or utilization information and store it in CMDB 402. SCM 428 may be configured to poll one or more rman modules 414, 434, 454 and 474 for performance and/or utilization information at specified intervals, for example, at predefined default intervals or intervals defined by a user through management application 418.

Any of a variety of techniques, data structures and system components may be employed, for example, by rman modules 414, 434, 454 and 474 and/or SCM 424, in monitoring, collecting and analyzing performance and utilization information. For example, in some embodiments of the invention, the performance and/or resource utilization of an application on a storage system, including the collection and analysis of information in relation thereto, may be performed using one or more suitable system components, techniques and/or data structures described in U.S. Pat. No. 10,339,455, titled "Techniques for Determining Workload Skew" to Parush-Tzur et al., issued Jul. 2, 2019 (hereinafter "Parush-Tzur"), the entire contents of which are hereby incorporated by reference. Such storage system components and data structures may be included in data storage system 400, which may be configured to implement such techniques.

MEM 426 may be configured to read such results from CMDB 402 and inform PCM 424 of such results. PCM 424 may be configured to read these recorded results from CMDB 402, and to determine whether load balancing or other performance and/or utilization objectives have been achieved, for example, using techniques described in Parush-Tzur, and control taking actions in response thereto. For example, PCM 424 may control maintaining and/or altering one or more containers executing applications 416, 436, 456 and 476, and/or remove or add one or more containers to one or more processing component 410, 430, 450 and 470, e.g., through API and/or CLI calls to CMM 304.

SCM 428 may be configured to mirror, clone, snap or the like the LSU associated with CMDB 402 to the LSU associated with CMDB 404, for example, at preset intervals. These intervals may be set to be relatively short so that the CMDB 402 LSU is frequently mirrored, cloned, snapped, and can be rebuilt using the CMDB 404 LSU in case of failure of CMDB 402.

In some embodiments, SCM 428 may be the only component of the master node 420 configured with both read and write permission to CMDB 402, and MEM 426 may be the only component aside from SCM 428 to have read permission to CMDB 402.

MEM 426 may be configured to monitor entries in CMDB 402 and take action accordingly. For example, as described in relation to SCM 428, one or more entries may be made in CMDB 402 pertaining to TTL, auto-upgrades, load balancing, performance and/or utilization. MEM 426 may be configured to read such entries and inform PCM 424 of the information contained therein, or at least certain information contained therein. In some embodiments, CMDB entries may include cron entries in accordance with Linux or another Unix-based OS, and MEM 426 may be configured to implement a cron utility to read such cron entries.

MEM 426 may be configured to monitor the state of master node 420. For example, MEM 426 may send heartbeat (HB) communications to other modules 422, 424 and 428 of master node 420, and monitor responses thereto. Further, MEM 426 may record status information about itself and other modules 422, 424 and 428 of master node 420, and monitor and analyze this status information. MEM 426 may be configured with intelligent platform management interface (IPMI) capabilities. In the event that MEM 426 detects that the master node 420, or any of its constituent components, is failing or has failed, MEM 426 may activate back-up master mode 420', for example, using its IPMI capabilities.

It should be appreciated that any of the functionality described in relation to modules 422, 424, 426 and 428 may be combined into one or more modules, or may be divided among more than four modules.

As noted elsewhere herein, each of the processing nodes 411, 431, 451 and 471 may be configured to include a network module 412, 432, 452 and 472, respectively, and a resource management (rman) module 414, 434, 454 and 474, respectively. Illustrative embodiments of network module 412 and rman module 414 will now be described. It should be appreciated that network modules 432, 452 and 472, and rman modules 434, 454 and 474 may be implemented in a same or similar manner as network module 412 and rman module 414, respectively.

Network module 412 may be a pod configured to create and manage network resources for applications executing on the processing component 410. Rman module 414 may be a pod configured to manage compute, memory and port resources for applications executing on the processing component 410. For example, Rman module 414 may be configured to manage CPU resources of a processing core 217a, memory resources of a global memory portion 214a and port resources (e.g., virtual port resources) of an HCA 215a of a director board 212a.

PCM 424 may issue a request for resources for an application to Rman module 414 based on user input received by management application 418, and may specify an LSU associated with the request. In response, Rman module 418 may reserve the required compute, memory and port resources for the application, associated with the LSU, and communicate the reservation of these resources to the PCM 424. PCM 424 may communicate instructions to CMM 422 to create the containers. Further, as described in more detail elsewhere herein, rman module 414 may be configured to be polled periodically by SCM 428 to provide performance and/or utilization information, in response to which rman module 414 may provide such information.

FIG. 5 is a flow chart illustrating an example of a method of using containers to implement applications on a storage system, according to embodiments of the invention. Other embodiments of a method of using containers to implement applications on a storage system, for example, variations of data storage system 300, are possible and are intended to fall within the scope of the invention. While embodiments described in relation to FIG. 5 describe a single container being created for an application, it should be appreciated that the invention is not so limited, as multiple containers on one or more processing components (e.g., 410, 430, 450 and 470) may be created and managed to implement an application.

In step 502, an application may be specified to be provisioned on a storage system (e.g., storage system 400). For example, a user may specify an application to be provisioned using management application 418 (e.g., U4P). The application may be any of a variety of applications and types of applications, including any of the applications described herein.

In step 504, resource requirements (e.g., compute, memory, networking) and other information may be specified. For example, if the application is a file system, a number of instances of the file system, number of network ports, replication availability, workload patterns, associated data and other information may be specified. Further, the user may specify whether to perform load balancing, performance analysis and/or utilization analysis. It should be appreciated that step 504 may include specifying modifications to existing applications, for example, adjustments to resource requirements. In some embodiments, the user inputs may be captured in XML format (e.g., as an XML-based file) or configured into XML format to be communicated to PCM 424.

In step 506, it may be determined (e.g., by PCM 424) whether another request for resources is currently being processed. If so, step 506 may be repeated until no other request is in progress. Alternatively, two requests may be processed in parallel. In some embodiments, PCM 424 does not even read the contents of a request for resources received from the management application until it is determined that no other request is in process.

Further, while not shown in FIG. 5, the user may be informed, e.g., through management application 418, that the request to implement the application is in process, for example, immediately following the completion of step 504 or any time up until performance of step 510 or 516. Further, in some embodiments, throughout performance of various steps 508-514, and sub-steps thereof, the status of processing the resource request may be reported to the user, for example, under control of the PCM 424 (which may be configured to control monitoring of the various steps and sub-steps) through the management application 418.

If it is determined in step 506 that another resource request is not currently being processed (or in some embodiments, even if another request is currently being processed), the contents of the resource request may be read, and it may be determined in step 508 whether resources are available, for example, collectively among the one or more processing components (e.g., 410, 430, 450 and 470) of the storage system. For example, step 506 may include the PCM 424 exchanging communications with one or more network modules 412, 432, 452 and 472 to determine whether sufficient network resources are available on the respective processing components of the one or more network modules. Each network module may determine whether it's respective processing component has adequate network resources and indicate success (i.e., sufficient network resources are available) or failure (sufficient network resources are not available) back to PCM 424.

Based on the responses received from network modules 412, 432, 452 and 472, PCM 424 may determine whether there are sufficient network resources for the application, e.g., whether at least one of the processing components 410, 430, 450 or 470 has enough network resource to execute a container for the application. If there are not sufficient network resources, in step 510 PCM 424 may communicate an instruction to the management application 418 to notify the user that the request to provision the application has failed, e.g., because there are insufficient network resources available. Such a communication may be configured (e.g., with an urgent/emergency flag) such that the notification to the user is designed to draw extra attention to the fact that not enough resources are available, which may require urgent measures to resolve.

If PCM 424 determines, based upon the network module responses, that there are sufficient network resources (e.g., at least one of the processing components 410, 430, 450 or 470 has enough network resource to execute a container for the application), then step 508 may include the PCM 424 exchanging communications with one or more rman modules 414, 434, 454, 474 to determine whether sufficient other resources (e.g., compute, memory, port) are available on the respective processing components of the one or more rman modules. Each rman module may determine whether it's respective processing component has adequate other resources and indicate success (i.e., sufficient other resources are available) or failure (sufficient other resources are not available) back to PCM 424. In some embodiments, each rman module may report success or failure for each of one or more specific resources (e.g., compute, memory, port).

Based on the responses received from rman modules 414, 434, 454, 474, PCM 424 may determine whether there are sufficient other resources for the application, e.g., whether at least one of the processing components 410, 430, 450 or 470 has enough other resources to execute a container for the application. If there are not sufficient other resources, in step 510 PCM 424 may communicate an instruction to the management application 418 to notify the user that the request to provision the application has failed, e.g., because there are insufficient other resources available. In some embodiments, the instruction communicated by PCM 424 and the notification to the user may specify which resource (e.g., compute, memory, port) is lacking, which may assist the user (e.g., storage admin) in addressing the lack of adequate resources.

If it is determined in step 508 (e.g., by PCM 424) that there are sufficient resources (e.g., network and other) available, e.g., to implement the application as a container on one of the processing components 410, 430, 450 and/or 470, then in step 512 the resources may be reserved. For example, PCM 424 may instruct the one or more network modules and rman modules of the processing components 410, 430, 450 or 470 that indicated they had sufficient resources to reserve such resources.

In step 514, one or more containers may be created (or modified) on the one or more processing nodes 411, 431, 451 and/or 471 of the one or more respective processing components 410, 430, 450 and/or 470 on which the resources have been reserved. For example, PCM 424 may control CMM 422 to create and deploy containers in accordance with the application request input by the user and the resources reserved in response to same. In controlling CMM 422, PCM 424 may communicate using any of a variety of known formats. For example, if CMM 422 includes a K-system, PCM 424 may communicate a YAML file to CMM 422 using kubectl CLI or kube-api REST API. In response, kube-scheduler and kube-api-server containers within CMM 422 may verify the YAML file, and communicate with the one or more processing nodes 411, 431, 451 and/or 471 having the reserved resources to create one or more containers thereon to implement the requested application. After having created the one or more containers, CMM 422 may report successful creation of the one or more containers to PCM 424.

In step 516, PCM 424 may control the management application 418 to notify the user (or multiple users or other entities) of the successful creation of the containers and/or that the application is ready to execute. In step 518, execution of the application may be initiated, for example, in response to input from a user. In some embodiments, execution of the application may be initiated automatically, for example, in response to creation of the containers being completed, before or after informing the user(s) in step 515.

In step 517, one or more container management databases may be updated with information about the one or more containers created. For example, PCM 424 may instruct SCM 428 to make such entries in CMDB 402. The information may include information related to input parameters provided by the user (e.g., in step 504) when creating the application. In some embodiments, it may be determined whether performance and/or utilization of the requested application should be performed in step 518. For example, auto-updates, load balancing, performance analysis and/or utilization analysis may have specified for the requested user application (e.g., in step 504). If one or more or the foregoing was specified, data collection may be scheduled in step 522. For example, PCM 424 may instruct SCM 428 to schedule such data collection. SCM 428 may be configured to update CMDB 402 accordingly (e.g., as part of step 517), for example, with cron entries to be read and executed by MEM 426, as described in more detail elsewhere herein.

In step 524, the utilization and performance of the application may be monitored. For example, SCM 428 may be configured to communicate with one or more of the rman modules 413, 433, 453 and 473 in accordance with such user specifications, and the one or more rman modules may collect such information, as described in more detail elsewhere herein. The collected information may be stored in CMDB 402.

In step 526, it may be determined whether modification to one or more applications are needed. For example, MEM 426 may be configured to read information stored in CMDB 402, including information resulting from information entered by the user in step 504 and performance and/or utilization results stored in CMDB 402 by SCM 428. For example, MEM 426 may determine (e.g., based on a cron job stored in CMDB 402) that an auto-update to one or more applications is required, or that load balancing is being implemented and that analysis of the collected utilization and/or performance information reveals that resources for one or more applications (and thus one or more containers pertaining thereto) needs to be added, removed and/or modified.

If it is determined in step 526 that modifications are required in step 526, method 500 may return to step 508. Otherwise, steps 524 and 526 may be continue to be performed.

If it is determined in step 518 that utilization and/or performance are not being monitored, then, in step 520, the application may continue to be executed without such monitoring.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 500, or parts thereof, may be implemented using one or more of the systems and/or data structures described in relation to FIGS. 1-4, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage system having a plurality of processing components that collectively provide resources for executing applications on the data storage system, each processing component being a physically discrete processing component, a method comprising:
   receiving resource requirements for a first application to execute on the data storage system, wherein said resource requirements include memory requirements of the first application and port resource requirements of the first application;
   reserving a quantity of resources on at least a first of the plurality of processing components, wherein said resources reserved by said reserving include memory and a number of ports based on the resource requirements;
   creating a plurality of containers on the at least first processing component, each of the plurality of containers having at least a portion of the quantity of reserved resources allocated thereto for executing the first application; and
   executing the first application by executing the plurality of containers on the at least first processing component, wherein each of the plurality of containers implements a portion of the first application, and wherein the plurality of containers executes in a single instance of an operating system in the data storage system, wherein one of the plurality of processing components includes a master processing node that controls performance of the method while the master processing node is active, wherein another of the plurality of processing components includes a mirrored master processing node, wherein the mirrored master processing node remains inactive while the master processing node is active and wherein, responsive to the master processing node being inactive, the mirrored master processing node serves as a backup master processing node and becomes active controlling performance of the method in place of the master node, and wherein the method further includes:
   a monitor and execution module (MEM) of the master processing node monitoring a state of the master processing node, wherein said monitoring includes:
   the MEM sending heartbeat communications to a plurality of other modules of the master processing node and monitoring responses to said heartbeat communications from the plurality of other modules; and
   responsive to the MEM detecting, in accordance with said monitoring of the responses to said heartbeat communications, that the master processing node or any component of the master processing node is failing or has failed, activating the mirrored master processing node to become active and the master processing node becoming inactive.

2. The method of claim 1, further comprising:
   determining whether the quantity of resources are available on the plurality of processing components collectively,
   wherein the steps of reserving, creating and executing are performed if it is determined that the quantity of resources are available on the plurality of processing components collectively.

3. The method of claim 2, further comprising:
   if it is determined that the quantity of resources is not available on the plurality of processing components collectively, notifying one or more entities that the quantity of resources is not available.

4. The method of claim 2, wherein the step of determining includes, on each of the plurality of processing components, one or more resource management components determining available resources on the processing component.

5. The method of claim 4, further comprising:
   receiving the resource requirements via a user interface module;
   the user interface module sending information indicative of the resource requirements to a control module of the master processing node; and
   the control module exchanging communications with the one or more resource components on each of the plurality of processing components to determine the available resources on each of the plurality of processing components.

6. The method of claim 5, wherein the master processing node includes a container management module for deploying and managing containers, the method further comprising:
   the control module providing instructions to the container management module to create the plurality of containers on the at least first processing component.

7. The method of claim 1, further comprising:
   monitoring activity on at least the first of the processing elements; and
   modifying the plurality of containers and/or adding more containers based on the monitored activity.

8. The method of claim 1, wherein the plurality of containers implements the first application and also implements data services for a second application executing on a host, wherein the data services include servicing I/O operations comprising read and write operations received at the data storage system from the second application, and wherein the method further comprises:
   receiving, at the data storage system, an I/O operation from the second application of the host; and
   servicing the I/O operation on the data storage system, wherein servicing the I/O operation includes performing a plurality of sub-operations executed in a distributed manner across at least two of the plurality of processing components, wherein the plurality of processing components is a plurality of director boards and each of the plurality of director boards includes a plurality of processing cores configured to perform processing for one of a plurality of directors.

9. The method of claim 8, wherein the port resource requirements include virtual port resources, and wherein the resources reserved include virtual port resources of one or more host adapters of one or more of the plurality of director boards.

10. The method of claim 1, wherein the plurality of containers executes on processing nodes of two or more of the plurality of processing components, wherein the single instance of the operating system includes an operating system kernel and an operating system user space, and wherein the plurality of containers executes, on the processing nodes of the two or more processing components, in the operating system user space on the data storage system.

11. A data storage system comprising:
    a plurality of processing components that collectively provide resources for executing applications on the data storage system, each processing component being a physically discrete processing component; and memory comprising code stored thereon that, when executed, performs a method comprising:
    receiving resource requirements for a first application to execute on the data storage system, wherein said resource requirements include memory requirements of the first application and port resource requirements of the first application;
    reserving a quantity of resources on at least a first of the plurality of processing components, wherein said resources reserved by said reserving include memory and a number of ports based on the resource requirements;
    creating a plurality of containers on the at least first processing component, each of the plurality of containers having at least a portion of the quantity of reserved resources allocated thereto for executing the first application; and
    executing the first application by executing the plurality of containers on the at least first processing component, wherein each of the plurality of containers implements a portion of the first application, and wherein the plurality of containers executes in a single instance of an operating system in the data storage system, wherein one of the plurality of processing components includes a master processing node that controls performance of the method while the master processing node is active, wherein another of the plurality of processing components includes a mirrored master processing node, wherein the mirrored master processing node remains inactive while the master processing node is active and wherein, responsive to the master processing node being inactive, the mirrored master processing node serves as a backup master processing node and becomes active controlling performance of the method in place of the master node, and wherein the method further includes:
    a monitor and execution module (MEM) of the master processing node monitoring a state of the master processing node, wherein said monitoring includes:
        the MEM sending heartbeat communications to a plurality of other modules of the master processing node and monitoring responses to said heartbeat communications from the plurality of other modules; and
        responsive to the MEM detecting, in accordance with said monitoring of the responses to said heartbeat communications, that the master processing node or any component of the master processing node is failing or has failed, activating the mirrored master processing node to become active and the master processing node becoming inactive.

12. The data storage system of claim 11, wherein the method further comprises:
    determining whether the quantity of resources are available on the plurality of processing components collectively,
    wherein the steps of reserving, creating and executing are performed if it is determined that the quantity of resources are available on the plurality of processing components collectively.

13. The data storage system of claim 12, wherein the method further comprises:
    if it is determined that the quantity of resources is not available on the plurality of processing components collectively, notifying one or more entities that the quantity of resources is not available.

14. The data storage system of claim 12, wherein the step of determining includes, on each of the plurality of processing components, one or more resource management components determining available resources on the processing component.

15. The data storage system of claim 14, wherein the method further comprises:
    receiving the resource requirements via a user interface module;
    the user interface module sending information indicative of the resource requirements to a control module of the master processing node; and
    the control module exchanging communications with the one or more resource components on each of the plurality of processing components to determine the available resources on each of the plurality of components.

16. The data storage system of claim 15, wherein the master processing node includes a container management module for deploying and managing containers, wherein the method further comprises:
    the control module providing instructions to the container management module to create the plurality of containers on the at least first processing component.

17. The data storage system of claim 11, wherein the method further comprises:
    monitoring activity on at least the first of the processing elements; and
    modifying the plurality of containers and/or adding more containers based on the monitored activity.

18. One or more non-transitory computer-readable media having software stored thereon comprising:
    executable code that receives resource requirements for a first application to execute on the data storage system having a plurality of processing components that collectively provide resources for executing applications on the data storage system, each processing component being a physically discrete processing component, wherein said resource requirements include memory requirements of the first application and port resource requirements of the first application;
    executable code that controls reserving a quantity of resources on at least a first of the plurality of processing components, wherein said resources reserved include memory and a number of ports based on the resource requirements;
    executable code that controls creating a plurality of containers on the at least first processing component, each of the plurality of containers having at least a portion of the quantity of reserved resources allocated thereto for executing the first application; and executable code that controls executing the first application by executing the plurality of containers on the at least first processing component, wherein each of the plurality of containers implements a portion of the first application, and wherein the plurality of containers executes in a single instance of an operating system in the data storage system, wherein one of the plurality of processing components includes a master processing node that controls performance of processing while the master processing node is active, wherein another of the plurality of processing components includes a mirrored master processing node, wherein the mirrored master processing node remains inactive while the master processing node is active and wherein, responsive to the master processing node being inactive, the mirrored master processing node serves as a backup master processing node and becomes active controlling performance of processing in place of the master node, and wherein the software further includes:

a monitor and execution module (MEM) of the master processing node monitoring a state of the master processing node, wherein said monitoring includes:

the MEM sending heartbeat communications to a plurality of other modules of the master processing node and monitoring responses to said heartbeat communications from the plurality of other modules; and responsive to the MEM detecting, in accordance with said monitoring of the responses to said heartbeat communications, that the master processing node or any component of the master processing node is failing or has failed, activating the mirrored master processing node to become active and the master processing node becoming inactive.

19. The one or more non-transitory computer-readable media of claim 18, wherein the software further comprises:

executable code that determines whether the quantity of resources are available on the plurality of processing components collectively, wherein reserving, creating and executing are performed if it is determined that the quantity of resources are available on the plurality of processing components collectively.

20. The one or more non-transitory computer-readable media of claim 19, wherein the software further comprises:

executable code that, if it is determined that the quantity of resources is not available on the plurality of processing components collectively, notifies one or more entities that the quantity of resources is not available.

21. The one or more non-transitory computer-readable media of claim 20, wherein the executable code that determines includes, on each of the plurality of processing components, one or more resource management components that determine available resources on the processing component.

22. The one or more non-transitory computer-readable media of claim 21, wherein the software further comprises:

executable code that receives the resource requirements via a user interface module;

executable code of the user interface module that sends information indicative of the resource requirements to a control module of the master processing node; and executable code of the control module that exchanges communications with the one or more resource components on each of the plurality of processing components to determine the available resources on each of the plurality of components.

23. The one or more non-transitory computer-readable media of claim 18, wherein the software further comprises:

executable code that monitors activity on at least the first of the processing elements; and executable code that modifies the plurality of containers and/or adding more containers based on the monitored activity.

* * * * *